(No Model.)
M. D. GOODWIN.
WHEEL FOR VEHICLES.
No. 586,267. Patented July 13, 1897.
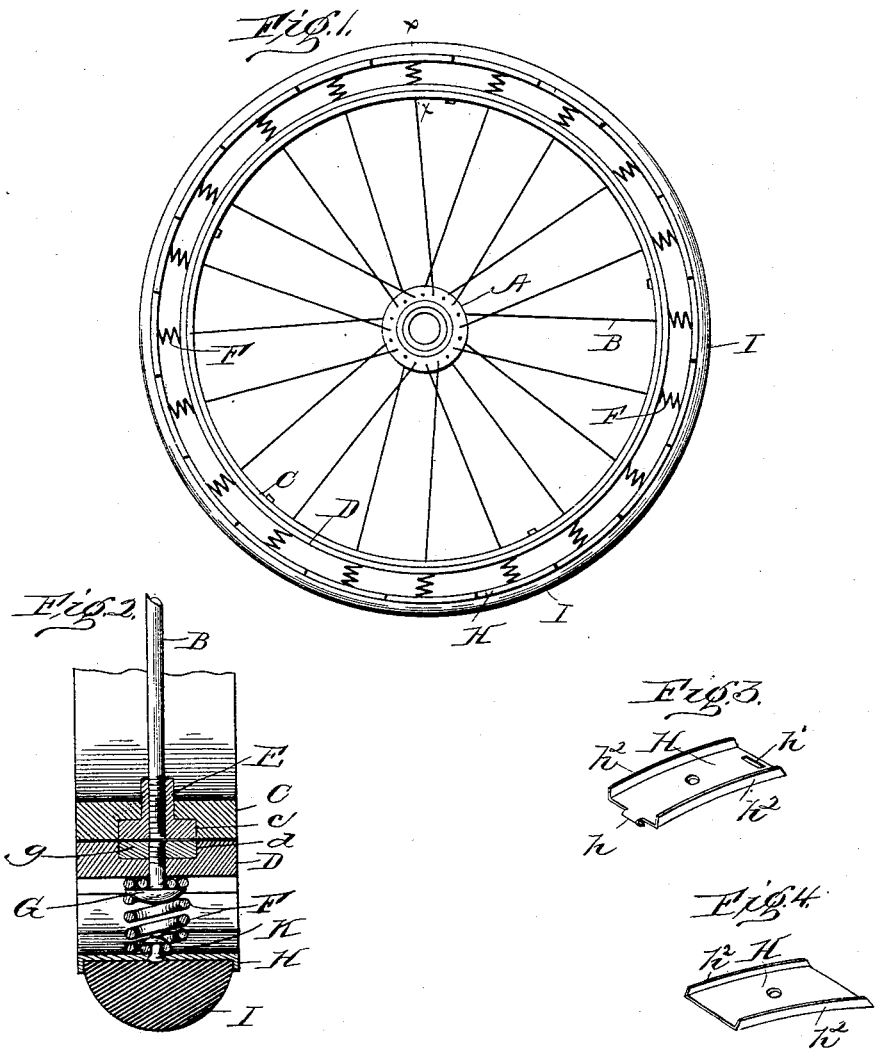
Witnesses:
J. M. Fowler Jr.
Thomas Durant
Inventor:
Mark D. Goodwin,
by Church & Church
his Attorneys.
THE NORRIS PETERS CO., PHOTO-LITHO., WASHINGTON, D. C.

UNITED STATES PATENT OFFICE.

MARK D. GOODWIN, OF PHILADELPHIA, PENNSYLVANIA.

WHEEL FOR VEHICLES.

SPECIFICATION forming part of Letters Patent No. 586,267, dated July 13, 1897.

Application filed June 6, 1896. Serial No. 594,562. (No model.)

*To all whom it may concern:*

Be it known that I, MARK D. GOODWIN, of Philadelphia, in the county of Philadelphia, State of Pennsylvania, have invented certain new and useful Improvements in Wheels for Vehicles; and I do hereby declare the following to be a full, clear, and exact description of the same, reference being had to the accompanying drawings, and the letters of reference marked thereon, forming a part of this specification.

This invention relates to improvements in wheels for vehicles especially adapted for use on cycles; and it consists in certain novel details of construction and combinations and arrangements of parts, all as will be now described in the following specification and the particular features of novelty pointed out in the appended claims.

In the accompanying drawings, Figure 1 is a side elevation of a wheel constructed in accordance with my invention. Fig. 2 is a section on the line $x\,x$, Fig. 1. Fig. 3 is a perspective view of one of the sections of the rim for holding the outer india-rubber tread portion of the tire. Fig. 4 is a view of a modified form of one of the plates constituting the outer elastic rim.

Referring to the drawings, the letter A indicates the hub of the wheel, and B the spokes, secured thereto in any desired or preferred manner. In the present construction what I term the "inner rim" of the wheel is composed of two parts C D, each provided with a longitudinal recess or channel $c\,d$, as shown, and within the part C are held the spoke-nuts E, the socketed ends of which extend through the rim and into which the ends of the spokes are screwed, as usual.

To the outer side of the part D of the inner rim are secured a series of coiled springs F, preferably made of steel wire, by means of bolts G, passing through the rim and held by the nuts $g$, located in the recess $d$ of the part D, as shown clearly in Fig. 2.

In order that the wheel may yield to the irregularities of the ground over which it may be traveling, it is desirable that the outer rim or that which carries the rubber tire shall be flexible, and this I accomplish by forming this outer rim of a series of short sections or links H, each preferably formed at one end with a hook $h$ and at the other with an eye or opening $h'$, whereby each link can be joined to the one next it and thereby form a complete rim, as will be readily understood. Each link is provided with upturned sides or flanges $h^2$, between which the india-rubber tread I is clamped and held, each link being secured to the outer end of the coiled springs by means of rivets K, passing through the links and headed up over the end of the spring.

Instead of uniting each of the links that make up the rim the links may be entirely separate and constructed as shown in Fig. 4.

From the above description it will be seen that the wheel yields to the slightest inequality in the ground and affords ease and comfort to the rider, and while possessing all the advantages of wheels equipped with the pneumatic tire is free from all the annoyance and inconvenience common to such tires through puncturing.

Having thus described my invention, what I claim as new is—

1. In a wheel, the combination with the inner two-part rim, an outer rim composed of plates having side flanges, the coiled springs each fastened at one end to each of said plates and at the other to outer part of the inner rim, the spokes secured to the inner part of said rim and the rubber tire carried by the outer rim; substantially as described.

2. In a wheel the combination with the inner two-part rim, each part formed with a longitudinal channel or recess, the outer rim formed of a series of plates flexibly joined together and having the side flanges, as shown, the spoke-nut, held within the recess in one part, the coiled springs, the bolt for securing the spring to the inner rim, the nut located in the recess in the rim for holding the bolts, the rivet for securing the plates to each spring, and the rubber tread held between the side flanges on the links; substantially as described.

MARK D. GOODWIN.

Witnesses:
H. F. REARDON,
CHAS. O. MORTAW.